United States Patent [19]

Paternostro

[11] Patent Number: 4,563,758
[45] Date of Patent: Jan. 7, 1986

[54] UNDERWATER COMMUNICATOR

[76] Inventor: Charles J. Paternostro, 9732 Dartridge St., Dallas, Tex. 75238

[21] Appl. No.: 427,450

[22] Filed: Sep. 29, 1982

[51] Int. Cl.⁴ ............................................. H04B 11/00
[52] U.S. Cl. ..................................... 367/132; 364/418; 381/51; 367/134
[58] Field of Search .................. 367/132, 134; 381/51; 364/418

[56] References Cited

U.S. PATENT DOCUMENTS

| | | | |
|---|---|---|---|
| 3,076,174 | 1/1963 | Wainwright et al. | 367/132 |
| 3,172,076 | 3/1965 | Alinari | 367/132 X |
| 3,786,406 | 1/1974 | Bianco | 367/134 |
| 3,875,336 | 4/1975 | Mullen, Jr. | 367/132 X |
| 3,909,773 | 9/1975 | Saltzer | 367/134 |
| 3,958,215 | 5/1976 | Bianco | 367/134 |
| 4,039,999 | 7/1977 | Weston | 367/132 |
| 4,096,466 | 6/1978 | Johnson | 367/132 X |
| 4,162,475 | 7/1979 | Fisher et al. | 179/1 UW |
| 4,210,971 | 7/1980 | Martin, Jr. | 367/134 |
| 4,305,143 | 12/1981 | Simms et al. | 367/134 |
| 4,307,266 | 12/1981 | Messina | 179/2 DP |
| 4,348,653 | 9/1982 | Tsuzuki et al. | 381/51 |
| 4,455,551 | 6/1984 | Lemelson | 381/51 |

OTHER PUBLICATIONS

An Advertisement For The Seapro SeaComp From *Skin Diver*, Jul. 1982.

*Primary Examiner*—Richard A. Farley
*Attorney, Agent, or Firm*—Richards, Harris, Medlock & Andrews

[57] ABSTRACT

An underwater communicator device (10) is disclosed which permits acoustic communication with another diver by use of a voice synthesizer (42) cooperating with an acoustic transducer (40). A display (34A) is also provided to visually communicate the message. The keyboard (18) of the device (10) permits the diver to communicate stored messages by activating a single key 54 or to enter a complete arbitrary message by keying in the actual message. In other forms, the device (10) can include an air pressure transducer (60) for monitoring air tank pressure with a warning of low pressure. A depth pressure transducer (64) can be incorporated into the device (10) to monitor the depth of the device and diver. A bottom timer can be incorporated within the device for measuring the time of the depth. These functions can be continuously displayed to the diver on display screen 34B. The microprocessor (46) within the device (10) can be provided with a mathematical representation of a dive table to calculate the decomposition needs of the diver based on the depth and bottom time measured.

20 Claims, 4 Drawing Figures

UNDERWATER COMMUNICATOR

BACKGROUND ART

Communication between divers underwater is critical for safety and contributes significantly to the enjoyment of underwater activities, whether for sport or business. In the past, visual communication has been made through hand gestures, slate boards or signal lights. However, it is often difficult or impossible to attract another diver's attention underwater unless that diver is nearby and looking in the direction of the diver requiring attention. Use of a slate board for writing messages underwater is subject to misunderstanding through poor visibility or poor penmanship. It is also awkward and time consuming, requiring the diver to employ both hands. Striking an air tank with a knife or other metal object to produce a clanking noise is another common form of communication, but is cumbersome, time consuming in an emergency and does not convey any specific message.

Several attempts have been made to overcome these shortcomings of prior communication procedures. One example is U.S. Pat. No. 3,909,773 issued to Saltzer. This patent discloses the use of a wrist carried keyboard control unit for use by a diver for two-way communication with a surface vessel. Prerecorded messages can be stored in a read only memory within the control unit. The diver can operate the keyboard to send the prerecorded message through a narrow band transmission to the surface vessel. The diver is also capable of sending a nonrecorded message by typing the message into the keyboard. The control unit can receive a message from the surface and retains the message in a memory until the diver can read the message.

However, a need exists for a device for underwater communication between divers which is self-powered, self-contained and does not constrain the mobility or motion of the diver. In addition, since a diver is impaired from speaking, but not from hearing or seeing over short distances underwater, a need exists for a device which permits communication through underwater acoustic speech transmission and visual transmission.

SUMMARY OF THE INVENTION

In accordance with one aspect of the present invention, an apparatus is provided for underwater communication between divers. The apparatus includes a waterproof case for carrying by a diver. A keyboard is mounted on the case for entry of a message to be communicated by the diver. A speech synthesizer is mounted within the case for acoustically transmitting the message entered to another diver. A visual display is mounted on the caes for visually displaying the message entered.

In accordance with another aspect of the present invention, the apparatus can include a memory for storing prerecorded messages which can be communicated acoustically and visually upon entry of a single request to communicate the message on the keyboard. The apparatus can also comprise means for measuring the depth and time elapsed underwater associated with means for calculating decompression requirements to inform the diver when he must return to the surface. A pressure transducer can be provided for measuring the pressure in the diver's air tank. The pressure transducer can be associated with a warning device to warn the diver, both acoustically and visually, of low air pressure.

BRIEF DESCRIPTION OF THE DRAWINGS

A more complete understanding of the invention can be had by referring to the following Detailed Description together with the accompanying Drawings, wherein.

DETAILED DESCRIPTION

Figure 1:
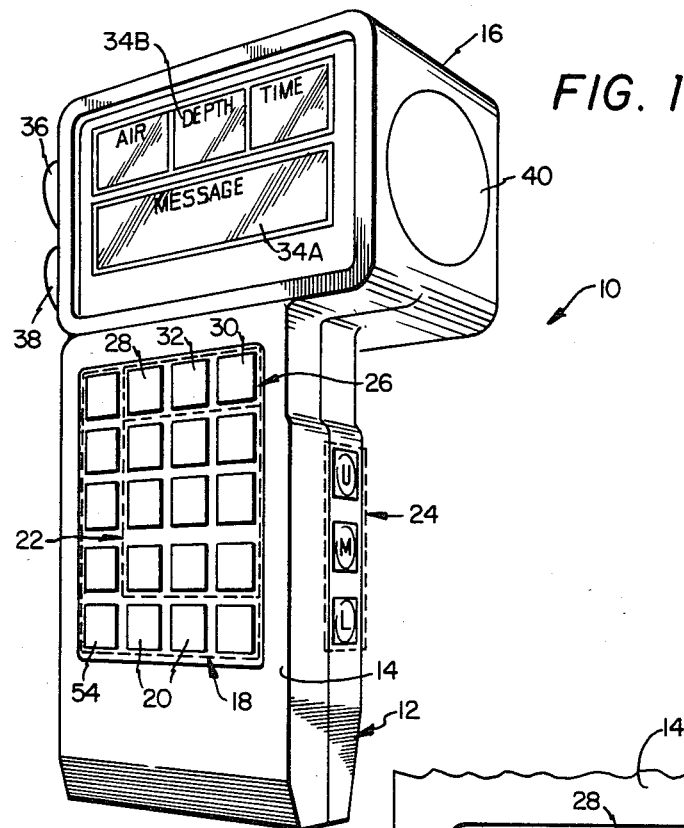
FIG. 1 is a perspective view of an underwater communicator device constructed in accordance with the teachings of the present invention.

Referring now to the Drawings, wherein like reference numerals designate like or corresponding elements throughout the views, there is shown an underwater communicator device 10 forming one embodiment of the present invention. The underwater communicator device 10 is capable of acoustically and visually transmitting messages underwater between divers. These messages can be prerecorded, standardized messages or totally arbitrary.

Figure 1A:
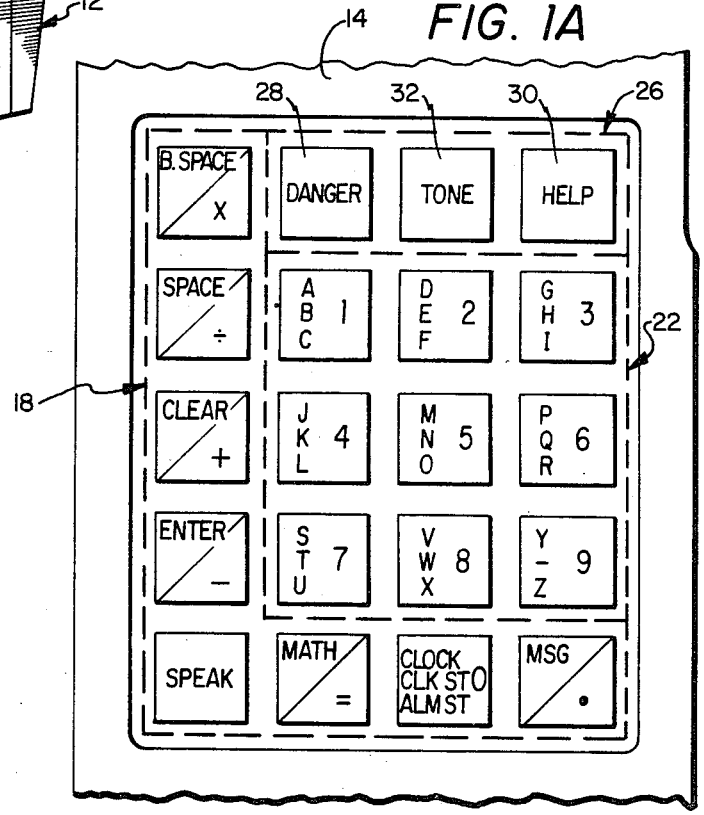
FIG. 1A is an illustration of the keyboard and visual display of the underwater communication device.

FIGS. 1 and 1A illustrate the device 10. The device 10 includes a high impact watertight case 12 for containing the components of the device. The case 12 is resistant to shock and impact loading comparable with other diving equipment. The case is watertight to any depth to which a diver could reasonably be expected to go. The case 12 includes an elongated narrow section 14, suitable for grasping by the hand, and a wide upper portion 16.

The lower portion 14 includes a keyboard 18 with individual keys 20 mounted thereon for activation by the diver. The keys can be categorized into several groups. An alpha numeric key group 22, used in conjunction with a shift key group 24, permits the diver to enter any alpha numeric message desired. The shift key group 24 consists of three keys, including the upper character, middle character and lower character represented by the U, M and L keys. An emergency key group 26 includes a DANGER key 28 and a HELP key 30. When either of these two keys are depressed, the message "danger" or "help" is acoustically transmitted continuously to the surrounding divers. In addition to the two emergency keys, group 26 also includes a TONE key 32 which provides a high pitched tone to attract the attention of divers far away. The frequency of the tone would be selective to extend the range of communication beyond that possible with voice communication alone. The TONE key 32 could also be used to transmit morse code signals at distances where speech communication would be impossible.

A lower visual display 34A is mounted on portion 16 for display of alpha numeric characters using light emitting diodes, to provide visibility in all lighting conditions. An upper visual display 34B, also mounted on portion 16, provides a visual readout display in different colored light emitting diodes of the essential functions of air tank pressure, present depth below the surface, and elapsed time from start of dive. A power on/off and loudness control 36 is mounted on one side of the upper portion 16 for switching the device on and off and setting the desired acoustic loudness. The keyboard 18 is backlighted or edge lighted for night or low visibility operation. A brightness control 38 near control 36 permits the brightness of the display 34 and back lighting of keyboard 18 to be varied and adjusted for light conditions. An acoustic transducer 40 is mounted in the case 12 opposite the controls and is capable of translating electrical energy into acoustic energy for propagation underwater to nearby divers.

Figure 2:
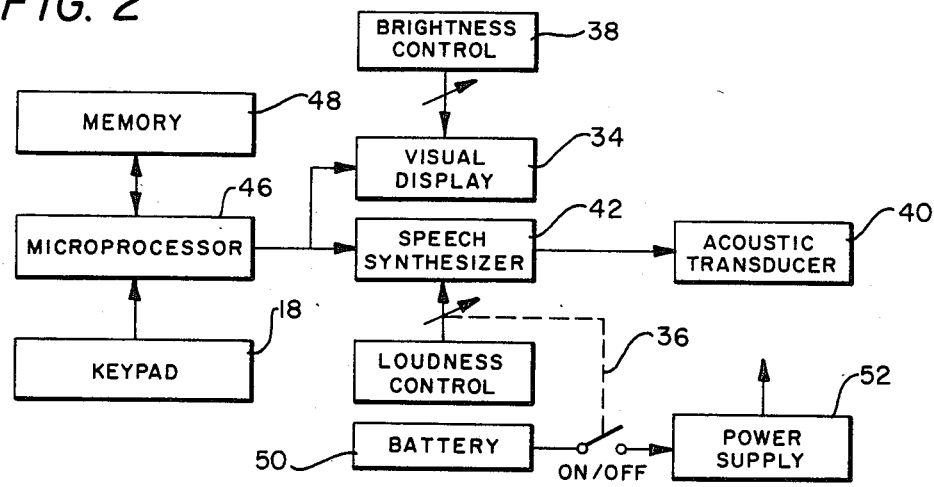
FIG. 2 is a functional block diagram of the underwater communicator device.

FIG. 2 illustrates a general functional block diagram of the electronics within the device 10. The device 10 includes a speech synthesizer 42 and visual display 34 comprising lower and upper visual displays 34A and 34B, each controlled by a microprocessor 46. The microprocessor 46 interacts with a memory 48 and the keyboard 18. The message to be communicated is either selected from memory by activation of a key on keyboard 18 or entered directly through keyboard 18. Microprocessor 46 processes the message to the visual display 34 and speech synthesizer. The speech synthesizer 42 produces electrical analog signals representing the message to be conveyed. These signals travel to the acoustic transducer 40 for conversion into audible sound. The display 34 converts the electrical signals from the microprocessor 46 into visual signals with the brightness controlled by control 38. A battery 50 and power supply 52 provide the necessary energy for operation of the device 10. The battery and power supply are located within the case 12 to make the device 10 a completely self powered unit.

The device 10 provides a diver with a great number of communication techniques. He can initially deactivate or activate the acoustical communication features by pressing a speak button 54 which controls the voice synthesizer. The visual display 34A can be made to present the message to be sent prior to acoustic transmission to verify that it is the one the diver desires to send acoustically. The diver can both visually and acoustically transmit any number of prerecorded messages limited only by the capacity of memory 48 by merely pushing the one button on the keyboard 18 that recalls the message from memory 48. A number of common messages can be programmed into the memory 48 by the factory. These "canned" messages can be listed in numerical order on the back of the device 10 for easy identification and retrieval, i.e. numbers 1 through 19. Examples of these messages are recorded below.

1. COME HERE
2. LOOK AT THIS
3. READ MESSAGE
4. HAVING TROUBLE
5. CHECK YOUR AIR
6. LOW ON AIR
7. NEED TO BUDDY BREATH
8. GOING UP
9. GOING DOWN
10. DON'T GO DEEPER
11. SLOW DOWN
12. STAY CLOSE
13. I'M COLD
14. I'M TIRED
15. CHECK OUR TIME
16. TIME IS UP
17. START BACK
18. WHICH WAY BACK
19. MAKE DECOMPRESSION STOP

In addition to prerecorded messages stored in the memory 48 at the factory, the individual diver can program a number of personalized messages in memory 48, i.e. numbers 20 through 29. This permits the diver the versatility to adapt the device 10 for his particular needs. Beyond prerecorded messages, the diver can enter through the alpha numberic key group 22 and into memory 48 any message whatsoever. The speech synthesizer 42 can also be used to verbalize the message depending upon the particular speech synthesizer employed.

In order to activate any prerecorded "canned" message or any personalized message, a diver would look on the lighted back of device 10 for the printed factory phase and number, or the handwritten personalized message and number. Once the message and number are selected, then the number is punched into the keyboard 18 and device 10 automatically displays the number and message selected on the lower visual display screen 34A. The diver then presses the SPEAK key 54 and the speech synthesizer 42 verbalizes the displayed message and sends it out through the water in the direction that device 10 is pointed by the diver.

The device 10 is small enough to be hand held when in use by the diver. When not in use, it need not be held since it is designed to be clipped onto a diver's air pressure hose, buoyance compensator or similar convenient attachment which will not impair the diver's motion when swimming.

The basic device 10 with microprocessor 46 is capable of performing other functions than the communication function noted previously. Such other capabilities could include the incorporation of an air tank pressure measuring system, a depth measuring system, a bottom timer and either mechanical or electronic methods for calculating decompression times based on standard dive tables.

Figure 3:
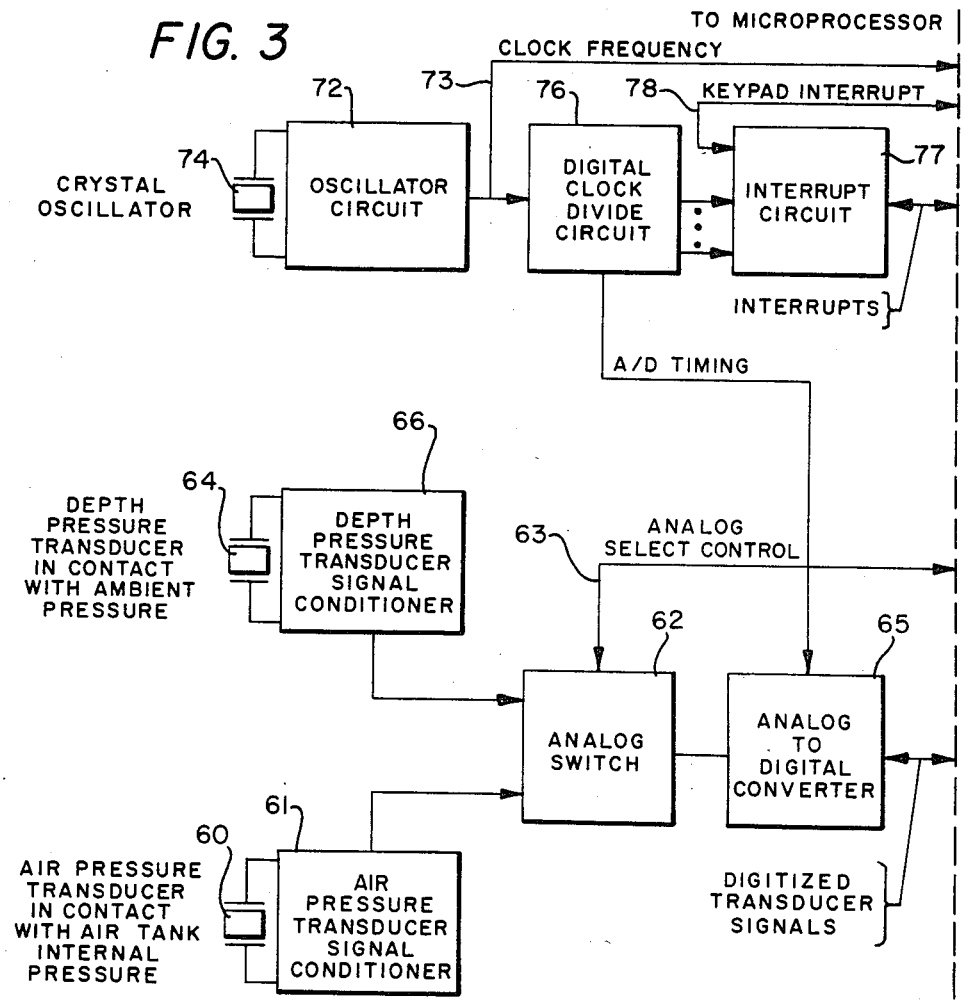
FIG. 3 is a functional block diagram of selected features in the underwater communicator device.

With reference to FIG. 3, an air pressure transducer 60 is mounted to the air tank valve on the diver's air tank and connected through waterproof electrical wires and connectors to the device 10. The transducer 60 is electrically connected to a depth pressure transducer signal conditioner 61 in device 10. The basic program of the microprocessor 46 inputs the air pressure transducer signal through an analog switch 62 controlled by analog select control 63. The program in microprocessor 46 waits until the analog signal is digitized in convertor 65 or actually controls the digitization process in simple hardware designs without a convertor and subsequently reads the digitized transducer signal into the microprocessor. The air pressure signal can then be scaled into numeric display numbers indicating the pressure on display 34B. Two safety features could be incorporated in the device 10 associated with the air pressure transducer. When the air pressure in the tank reaches 500 pounds per square inch, a chirping noise would be generated by the acoustic transducer 40 that would occur, for example, every 60 seconds. When the air pressure transducer measures a tank pressure of 300 pounds per square inch, a high/low warbling noise would be generated by acoustic transducer 40 at intervals, for example, of every 30 seconds to provide multi-stage warning to the diver as his air runs low.

A depth pressure transducer 64 can be provided which is exposed to the water surrounding the diver to sense the ambient water pressure. The transducer signal is processed through a depth pressure transducer signal conditioner 66 in device 10 and to analog switch 62.

The program in microprocessor 46 again selects the depth pressure transducer signal through the analog select control 63. The program waits until the analog signal is digitized or again controls the digitization process in analog to digital converter 65. The digitized pressure transducer signal is then entered into the microprocessor where it can be displayed on display 34B or retained as a function of time in the memory 48.

The microprocessor 46 incorporates an oscillator circuit 72 employing a crystal oscillator 74. The oscillator circuit 72 is necessary to provide a high speed clock frequency 73 used by the microprocessor 46 to sequence through its stored program instruction set. The device 10 can incorporate an elapsed time function for measuring the elapsed time from entering the water until resurfacing by supplementing the oscillator circuit with a digital divide circuit 76. The circuit 76 provides interrupt timing to the existing interrupt circuit 77 of the microprocessor 46.

For example, in a typical design, the digital divide circuit 76 can be designed to produce a one kilohertz interrupt and a one hertz interrupt by appropriate division of the basic clock frequency generated by the crystal oscillator 74. The microprocessor 46 will service each interrupt in a priority sequence. The highest priority interrupt would be the one kilohertz interrupt. The key pad interrupt 78 would be the next highest priority and would occur each time the diver depresses a key on keyboard 18. The one hertz interrupt would be the lowest priority interrupt.

With the digital clock divide circuit 76, an elapsed time function can be readily carried out by the microprocessor 46. The microprocessor 46 can simply start a software timer program which zeros a location in memory 48 at a specific starting time event, such as entry into the water, and subsequently increments the content of the memory at every one second interval until a specific stop time event, such as leaving the water. These start and stop time events can be entered manually by the operator using the keyboard 18 or can be initiated automatically by incorporating the depth pressure transducer 64. For example, the start time event could be the point where the diver first goes below a ten foot depth as measured by the depth pressure transducer 64. The stop time event, in turn, could be when the diver rises to the five foot depth as measured by the depth pressure transducer 64. A simple elapsed time function could be designed to operate independently of the power on/off control 36 so that the timer operates continuously without the necessity to employ the other features of the device 10.

With the elapsed time feature, the diver can manually calculate, while underwater, the various decompression stops he must make dependent upon his down time. It is also possible to program the microprocessor 46 with a mathematical representation of a preferred dive table to have the device 10 continuously and automatically calculate the necessary dive calculations and decompression stops during the dive. The instantaneous readout of air pressure, depth and elapsed time could be displayed on the display 34B in different colors and viewed on an upper screen as a continuous readout display.

Although a particular embodiment of the invention has been illustrated in the accompanying Drawings and described in the Detailed Description, it will be understood that the invention is not limited to the embodiment disclosed, but is intended to embrace any alternatives, modifications and/or substitutions of elements falling within the scope of the invention as defined by the following claims.

I claim:

1. An apparatus for underwater communication between divers, comprising:
   a waterproof case for carrying by a diver;
   a keyboard mounted on said case for entry of a message to be communicated by the diver;
   a speech synthesizer within said case for acoustically transmitting the message to be communicated to another diver, the transmitted message being aurally comprehensible to the other diver; and
   a visual display mounted in said case for visual display of the message to be communicated.

2. The apparatus of claim 1 wherein said apparatus includes a memory means for storing a predetermined message in operable communication with said keyboard so that the diver can cause the predetermined message to be communicated by a single key command entered into the keyboard.

3. The apparatus of claim 1 further comprising pressure sensor means for sensing the air pressure in the air tank of the diver and warning means for acoustically warning the diver when the air pressure in the tank decreases below a predetermined level.

4. The apparatus of claim 1 further comprising depth pressure sensing means for sensing the pressure in the water around the apparatus and displaying the depth on the visual display.

5. The apparatus of claim 1 further comprising timer means for timing the bottom time of the diver and displaying the elapsed time on the visual display.

6. The apparatus of claim 1 further comprising means for generating a tone activatable by a key on the keyboard for underwater communication to another diver.

7. The apparatus of claim 1 further comprising:
   timer means for measuring the time elapsed from the beginning of a dive;
   depth sensing means for sensing the depth of the apparatus within the water; and
   means for calculating the decompression stops for the diver based on the elapsed time measured by said timer means and depth measured by said depth sensing means and displaying the calculated decompression stops on the visual display.

8. An apparatus for underwater communication between divers, comprising:
   a waterproof case for carrying by a diver;
   a keyboard mounted on said case and having keys thereon, said keyboard including an alpha numeric key group, an emergency key group, and a memory key group, the keys for entry by the diver of a message to be communicated to another diver;
   a speech synthesizer within said case for producing an analog signal representing the message entered by the diver on the keyboard;
   an acoustic transducer for transforming the analog signal from the speech synthesizer to acoustic energy for communication to the other diver, the communicated message being aurally comprehensible to the other diver;
   a visual display mounted in said case for visual display of the message entered by the diver; and
   microprocessor control means for responding to key input by the diver on the keyboard and controlling the speech synthesizer and visual display to communicate the message entered to the other diver, the alpha numeric group of keys permitting entry of an arbitrary message for communication, the emergency key group being for communication of an emergency message by activating a single key on the keyboard to communicate the message.

9. The apparatus of claim 8 wherein said apparatus further comprises a pressure transducer for measuring the pressure in the air tank of the diver, said microprocessor control means processing the information from the pressure transducer to display the instantaneous air pressure on the visual display, said microprocessor control means activating an acoustic alarm transmitted by the acoustic transducer when the air pressure falls below a predetermined level.

10. The apparatus of claim 8 wherein said apparatus further comprises a water pressure transducer for sensing the pressure of the water about the apparatus, said microprocessor control means for causing the depth to be displayed on said visual display.

11. The apparatus of claim 8 wherein said keyboard further comprises a tone key, said microprocessor control means reacting to activation of said tone key to cause generation of a tone by the acoustic transducer for communication to another diver.

12. The apparatus of claim 8 further comprising:
timer means for measuring the elapsed time of the dive, the elapsed time being stored in a memory contained in said microprocessor control means;
depth measurement means for measuring the depth of the apparatus, the memory in the microprocessor control means recording the depth as a function of time from the beginning of the dive; and
said microprocessor control means calculating the decompression necessary by the diver as an instantaneous function of the elapsed time and depth of the dive recorded in the memory.

13. An apparatus for underwater communication between divers, comprising:
a waterproof case for carrying by a diver;
a keyboard mounted on said case for entry by the diver of a message to be communicated, the keyboard including keys organized in an alpha numeric key group, a shift key group for selecting particular alpha numeric characters in the alpha numeric key group, an emergency key group, and a memory key group;
microprocessor control means including a memory for converting key action from the keyboard into electronic signals representing the message to be communicated;
a speech synthesizer within said case for converting the signal from said microprocessor control means to an analog electric signal representing an acoustic message;
an acoustic transducer mounted on the case for acoustically transmitting the message to another diver, the analog electrical signals from the speech synthesizer being transduced within the acoustic transducer to acoustic energy, the transmitted message being aurally comprehensible to the other diver; and
a visual display mounted on said case for visual display of the message entered, the message being visually displayed before acoustic transmittal to permit diver confirmation of the message to be communicated.

14. The apparatus of claim 13 wherein the diver can input a message to the memory of said microprocessor control means by keyboard action, said message being communicated by activating a single key in the memory key group on the keyboard, the speech synthesizer permitting the message to be transmitted acoustically.

15. The apparatus of claim 13 wherein activation of an emergency key in the emergency key group communicates an emergency message on a continuous basis by activation of the single emergency key.

16. The apparatus of claim 13 wherein said keyboard further includes a tone key for generating an acoustic tone with the acoustic transducer, selective activation of the key permitting transmittal of a message.

17. The apparatus of claim 13 including:
a water depth pressure transducer mounted on said case for measuring the water pressure, said microprocessor control means converting the signal from the transducer to a visual indication of water depth on the visual display.

18. The apparatus of claim 13 further including:
an air pressure transducer mounted on the air tank of the diver in electrical communication with the microprocessor control means in said case, said microprocessor control means converting the signal from the transducer to a visual readout of air pressure on the visual display.

19. The apparatus of claim 18 wherein said microprocessor control means energizes the acoustic transducer to signal an emergency signal when the air pressure measured decreases below a predetermined limit.

20. The apparatus of claim 13 further including:
a depth pressure transducer for measuring the water pressure;
a timer for timing the elapsed time from an initial event; and
said microprocessor control means for processing the information from the timer and depth pressure transducer to determine the decompression requirements of the diver.

* * * * *

UNITED STATES PATENT AND TRADEMARK OFFICE
CERTIFICATE OF CORRECTION

PATENT NO. : 4,563,758
DATED : January 7, 1986
INVENTOR(S) : Charles J. Paternostro It is certified that error appears in the above-identified patent and that said Letters Patent is hereby corrected as shown below:

IN THE ABSTRACT

Line 19, change "decomposition" to --decompression--.

(Technical Field omitted in issued patent. Please add.)

--TECHNICAL FIELD

This invention relates to communication underwater, and in particular to communication between divers.--.

Signed and Sealed this

Fifteenth Day of April 1986

[SEAL]

Attest:

DONALD J. QUIGG

Attesting Officer   Commissioner of Patents and Trademarks